A. TURNBULL.
Letter-Scales.

No. 166,569. Patented Aug. 10, 1875.

Witnesses

Andrew Turnbull
Inventor
By Atty

UNITED STATES PATENT OFFICE

ANDREW TURNBULL, OF NEW BRITAIN, CONNECTICUT, ASSIGNOR TO LANDERS, FREARY & CLARK, OF SAME PLACE.

IMPROVEMENT IN LETTER-SCALES.

Specification forming part of Letters Patent No. 166,569, dated August 10, 1875; application filed March 18, 1874.

*To all whom it may concern:*

Be it known that I, ANDREW TURNBULL, of New Britain, in the county of Hartford and State of Connecticut, have invented a new Improvement in Letter-Scales; and I do hereby declare the following, when taken in connection with the accompanying drawings and the letters of reference marked thereon, to be a full, clear, and exact description of the same, and which said drawings constitute a part of this specification, and represent, in—

Figure 1:
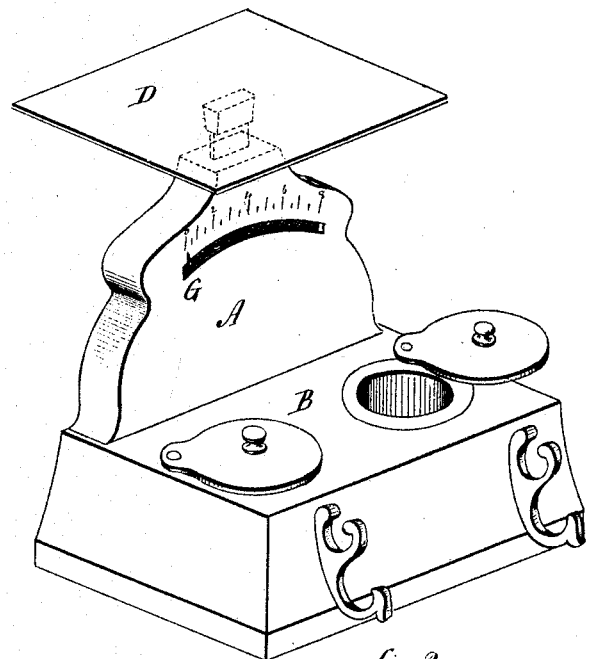
Figure 2:
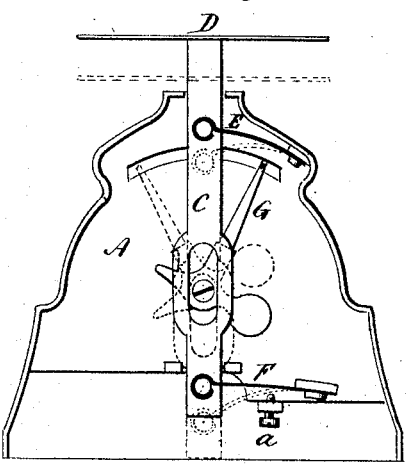

Figure 1, a perspective view, and in Fig. 2 a rear view, the covering-plate removed.

This invention relates to the construction of a weighing-scale, such as may be combined with inkstands or other office table-furniture, for weighing letters and light articles; and it consists in a vertical post, upon the top of which the platen is placed, the post hung to two parallel springs, one above the other, and one or both made adjustable, combined with a pointer and dial for indicating the depression of the post, all as more fully hereinafter described.

A is the case inclosing the mechanism of the scale, and here represented as a part of a case or holder, B, for ink-wells. Within the case is arranged a vertical post, C, upon the top of which is fixed the platen D. E F are two springs, preferably made from flat steel, one end of each rigidly fixed to the case, the other end attached to the post, so that while allowing the post to rise and fall they support the post in its vertical position. G is the pointer extending through to the front of the case, and in connection with the post, as seen in Fig. 2, so that as the post is depressed the pointer will travel accordingly over the dial, and indicate the amount of depression. Beneath one of the springs F an adjusting-screw, $a$, is placed, by turning which the tension of the spring is made greater or less, so as to adjust the power of the spring according to the graduations on the dial, and to the greatest nicety.

I claim as my invention—

The post C, supporting the platen D, combined with the parallel springs E F, one of which is made adjustable by a screw, $a$, and provided with the weighted pointer G, substantially as specified.

ANDREW TURNBULL.

Witnesses:
C. S. LANDERS,
J. C. ATWOOD.